United States Patent [19]
Faeth

[11] 3,838,658
[45] Oct. 1, 1974

[54] STEADY HEAT GENERATING REACTOR
[75] Inventor: Gerard M. Faeth, State College, Pa.
[73] Assignee: The United States of America as represented by the Secretary of the Navy, Washington, D.C.
[22] Filed: Apr. 17, 1973
[21] Appl. No.: 351,910

[52] U.S. Cl. .................. 114/20 R, 60/37, 60/50
[51] Int. Cl. ... F42b 19/12, F42b 19/20, F42b 19/18
[58] Field of Search ............ 60/37, 24, 50; 126/263; 114/20

[56] References Cited
UNITED STATES PATENTS
3,353,349  11/1967  Percival .................................. 60/37
3,413,801  12/1968  Meijer et al. ........................... 60/37
3,418,804  12/1968  Meijer et al. ........................... 60/37

Primary Examiner—Benjamin A. Borchelt
Assistant Examiner—Thomas H. Webb
Attorney, Agent, or Firm—R. S. Sciascia; P. Schneider; R. B. Rothman

[57] ABSTRACT

A steadily operating reactor system employing a molten alkali metal as a fuel and a halogen or halogenated gas or liquid as an oxidizer includes a main reactor vessel which is continuously supplied with fuel and oxidizer. Reaction products generated during the reaction form a separate product-rich, liquid layer in the molten alkali metal, which layer is removed from the reactor vessel. In one embodiment, a trap connected to a storage tank may be heated to cause the separation of unreacted fuel and reaction products in the product-rich layer. A pump system connected to the tank removes the unreacted fuel for reintroduction to the main reactor vessel.

9 Claims, 3 Drawing Figures

STEADY HEAT GENERATING REACTOR

BACKGROUND OF THE INVENTION

The present invention relates generally to a steadily operating reactor system which serves as a high temperature source of heat. More specifically, this invention relates to a reactor which combines halogen or halogenated gases or liquids with molten alkali metals to accomplish the conversion of chemical to thermal energy. These reactants release a relatively large amount of the thermal energy per unit volume and weight. Moreover, their reaction does not result in the formation of gaseous reaction products.

Because the volume of the reaction products is almost equal to that of the original alkali metal fuel, reactor systems in the past have merely stored the product material in the original fuel tankage. Such an arrangement allows the system to be operated closed, without connection to the ambient environment. This characteristic is particularly desirable for operating at extreme depths underwater, where the exhaust of combustion gases can be realized only with very great difficulty as a result of the high pressure of the surrounding water.

Reactors of this type have been employed or their use has been suggested for closed and open cycle thermal engines or thermal electric devices as well as for general heating applications. For confined systems, the desirability of combining halogen or halogenated gases, particularly fluorine or compounds rich in fluorine, and alkali metals, particularly lithium, due to the large amount of thermal energy available from these reactants per unit weight and volume, is also well known. The use of sulfur hexafluoride and the fluorine rich freon compounds has also been proposed previously as oxidizer materials of desirable energy density which are nontoxic and relatively safe to handle.

Furthermore, the fact that the reaction products of these fuel-oxidizer combinations are solids or liquids which do not significantly increase the total volume of the system is well recognized. This characteristic provides a nearly constant volume energy source which need not exhaust reaction products to the surroundings.

Heretofore, thermal energy sources employing halogen or halogenated gases and liquids and molten alkali metals have not operated steadily but as batch reactors. The entire fuel inventory for the mission in a batch reactor is contained within the tank where the reaction proceeds. The oxidizer is forced into the reactor tank through injector systems of various designs after the alkali metal has been liquified by heating. The rate of energy release of the reactor is controlled by varying the rate of oxidant inflow.

Reaction product materials in such reactors are liquids or solids of nearly the same volume as the molten fuel, and the products simply are allowed to accumulate within the batch reactor. In those cases where the volume of the products is slightly larger than that of the fuel, the reactor is designed to provide sufficient inital ullage to accommodate the increase in volume. The thermal energy of the reaction is removed by heat exchanger surfaces on or within the batch-reactor vessel. Heat transfer occurs from the molten batch to the working fluid of a power cycle or for other heating purposes. In some cases, heat transfer is accomplished by direct contact of an inert gas which is bubbled through the reactor and then removed after trapping out condensable maerials. The operation of the batch reactor is concluded when all the fuel has been consumed, and the reactor is filled with product material.

Limited reaction volumes in practical systems usually require the reactor operation to be terminated prior to complete reaction of the fuel. Reinitiation of the reaction process requires removal of the reaction products from the reactor and refilling with alkali metal fuel. Since refilling is usually inconvenient during a given mission, the reactor must initially contain sufficient fuel for the entire mission. For a specified energy release rate, there is a mission time in which the reactor volume required to store sufficient fuel for the mission and the volume required to provide sufficient heat exchanger surface area for the reactor are matched. For mission times longer than this condition, the reactor volume becomes large in comparison to that required to provide sufficient heat exchanger area.

The size of batch reactors for long mission times results in a number of undesirable consequences. A reactor containing a full fuel-product inventory for a long mission has a large thermal capacity in comparison to the desired energy release rates; therefore, reasonable start-up times as well as reactor temperature control to meet varying energy release rate requirements becomes problematical. Parasitic heat loss becomes a problem when only a small portion of the surface area is actually required to transmit thermal energy for the reactor application. High temperature insulation requirements in larger reactors cause weight, volume and cost penalties. Safety of personnel also becomes a greater problem.

SUMMARY OF THE INVENTION

The reactor system of the present invention provides for continuous removal of the reaction products from the reactor. Fuel and oxidizer are suppled steadily to a separate reactor vessel, the volume of which is optimized for proper heat transfer of thermal energy from the reactor. The presence of two immiscible liquids—the molten alkali metal and the reaction products—at temperature near the melting point of the reaction products provides a convenient means of separating the reaction products from any unreacted metal. Separation is accomplished by allowing the product-rich phase to settle, since its density is greater than the fuel-rich phase in the reactor vessel. The reaction product material is separated and any unreacted fuel is returned to the reactor vessel in a continuous transfer. Using a trap to control the product outflow ensures a high utilization of the chemical energy of the reaction.

OBJECTS OF THE INVENTION

An object of the present invention is to operate a heat-generating reactor which combines a halogen or halogenated gas or liquid with lithium or another alkali metal in a steady fashion with continuous removal of the reaction products from the reactor.

Another object is to continuously operate a heat-generating reactor in which only a small portion of the fuel-product material need be at the temperature levels of the reactor.

A further object of the invention is to eliminate the necessity of valves in the fuel inflow and product outflow lines leading to an from the reactor vessel.

Still another object is to return any unreacted fuel carried off with the reaction products to the reactor vessel.

A still further object is to provide a reactor system which does not need to be removed from its point of application for refueling.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
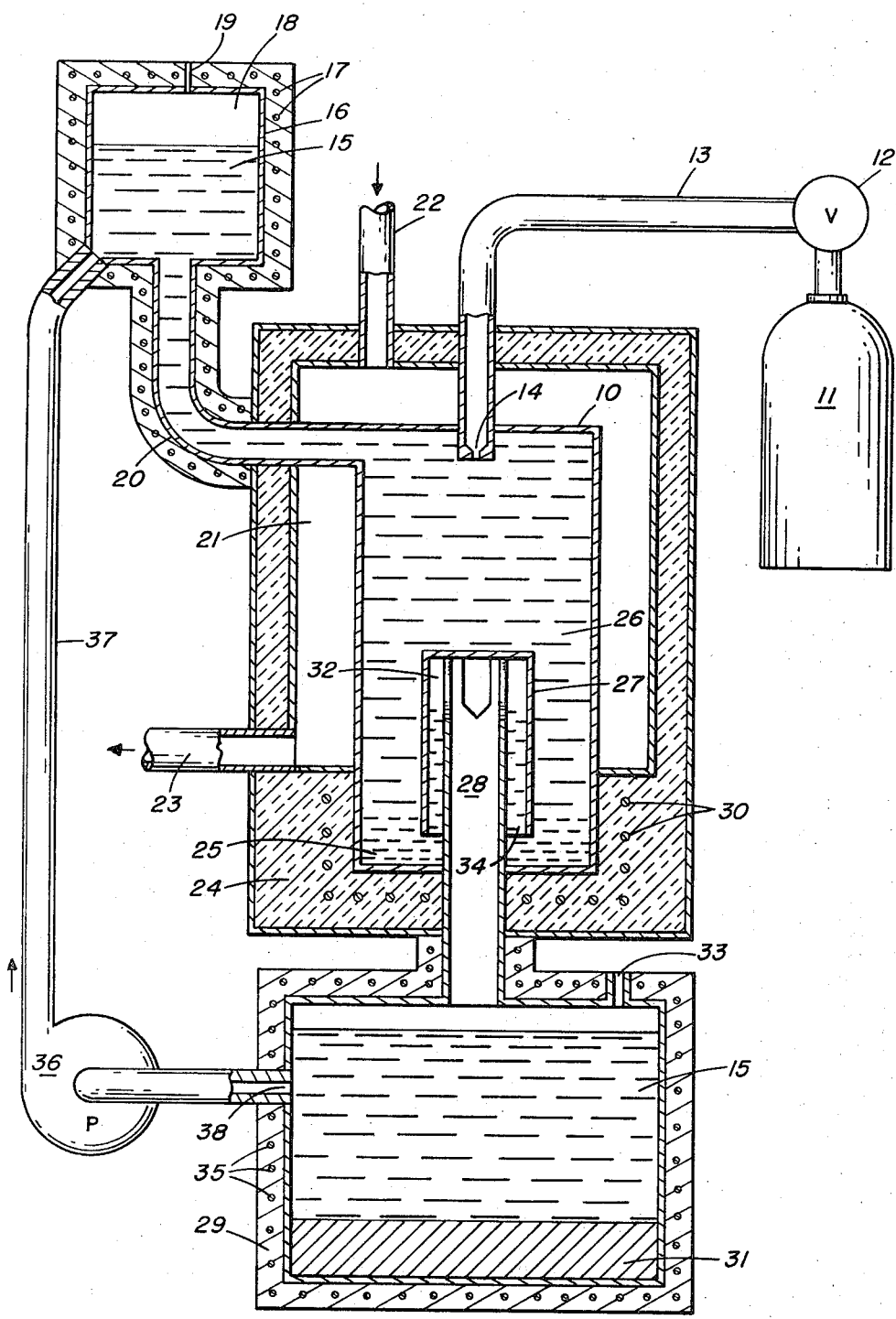
FIG. 1 is a diagrammatic representation of a preferred embodiment of the steady reactor system of the present invention.

FIG. 1, which illustrates a preferred embodiment of the reactor system, shows a reactor vessel 10 connected to an oxidizer storage tank 11 which contains a halogen or halogenated gas or liquid, for example sulfur hexafluoride. The oxidizer is fed to the reactor through a valve-pressure regulator 12, flow line 13 and an injector nozzle 14. The valve-pressure regulator 12 may be of any suitable known type of valve and flow controller. In certain instances other devices such as pumps, compressors and heat exchangers may be required to process the oxidizer flow in order to obtain proper conditions at the outlet of nozzle 14. The rate of chemical energy release is controlled by the oxidizer flow rate by means of the valve-pressure regulator 12 or other analgous flow control devices.

The lithium or other alkali metal fuel 15 is stored in the fuel tank 16 in the liquid state. The fuel tank is electrically heated and covered with insulation 17 in order to maintain the fuel above its melting temperature. The gas phase 18 above the molten fuel is kept at local atmospheric pressure by means of a vent 19 or controlled at any other desired pressure by standard pressure control devices. Contamination or oxidization, by air, of the fuel in the tank 16 may be prevented by filling the gas phase 18 with an inert gas, such as argon, and maintaining a slow flow of inert gas out through the vent 19 from some auxiliary supply of inert gas (not shown). The fuel enters the reactor as a liquid through the heated and insulated line 20. Any suitable electrical heating coil may be used for this purpose.

The entire fuel inventory need not be kept in the fuel tank 16. Additional fuel in liquid or solid form may be added to the tank 16 as required. Standard procedures for preventing air contamination of the fuel during this refueling operation should be employed.

The reaction occurs within the molten metal in the vicinity of the oxidizer injector 14. The thermal energy released by the reaction is removed through heat transfer surfaces located on or within the reactor. The configuration shown in FIG. 1 illustrates the case where a coolant gas or liquid is circulated about the external surfaces of the reactor vessel 10. The coolant fluid enters the heat exchanger passage 21 at inlet 22 and leaves at outlet 23. Other configurations for reactor heat removal include heat exchanger tubing within the molten liquid, heat pipes attached to the surface of the reactor, natural convection and radiation from the reactor surface as well as numerous other known heat exchanger devices. The exterior surfaces of the reactor system in the present configuration are insulated as indicated at 24 to reduce any parasitic heat loss.

The reaction products produced during a reaction between a halogen oxidizer and an alkali metal fuel and the original alkali metal fuel form an immiscible liquid system over a reasonably wide temperature range. For example, when lithium is reacted with fluorine, the reaction product, lithium fluoride, forms an immiscible liquid system with lithium between approximately 848° and 1,328° C. Similarly, a reaction of sodium with chlorine yields sodium chloride which forms an immiscible liquid system with the sodium between 795° and 1,080° C. The lower immiscible liquid limit represents a monotectic temperature at which the product materials solidify. For the most part, the solubility characteristics of the two liquids are such that there is a relatively low concentration of alkali metal in the product-rich liquid except near the upper temperature limit of the immiscible liquid range. Furthermore, the product-rich liquid generally has a much greater density than the metal-rich liquid, particularly in the case of lithium.

The present invention utilizes these immiscibility characteristics for its operation. If the reactor is operated at temperature levels within the immiscible liquid range, the product-rich liquid formed in the reaction zone will settle to the bottom of the reactor in a liquid layer 25 below the metal-rich liquid 26. The product-rich liquid then flows out of the reactor through a trap 27 and an exhaust line 28 into a product storage tank 29.

The trap 27 and the exhaust line 28 must be maintained at a sufficiently high temperature to maintain the product-rich liquid in its liquid state to prevent blockage of the exhaust flow. This temperature can be ensured by insulating and heating the bottom of the reactor with a heating coil 30, if necessary. Although the product-rich liquid enters the storage tank 29 as a liquid, the reaction products 31 soon settle and solidify due to heat exchange with the surroundings so that the bulk of the reaction products may be stored as a solid.

Atmospheric pressure is maintained in the gas space over the trap exit 32 by using an oversized exhaust line 28 that is not completely filled with liquid and a vent 33 to the surroundings. The pressure may be maintained at any other desired level by standard pressure control devices, a pressure regulator at vent 33, for example. To prevent undesirable contamination of the product-rich liquid in the trap, an inert gas may be kept in the region at the trap exit 32 and throughout the exhaust system from an auxiliary inert gas supply (not shown). The outward flow of inert gas through the vent 33 would prevent the entrance of contamination air at this point.

As indicated above, the reaction products 31, will settle and solidify in product storage tank 29, if not kept at a high enough temperature. More than one product storage tank could be employed. For example, exhaust line 28 once out of reactor vessel 10 could branch out into a plurality of lines each connected to a different product storage tank (not shown). Valves in the lines could control the flow of product-rich liquid to these tanks. Thus, the tanks could be filled and replaced as needed. Under appropriate conditions, the product storage tank can be dispensed with entirely and the product-rich material simply accumulated in an open bin or removed by some other waste disposal method.

The level of the product-rich liquid in the reactor is controlled hydrostatically by the height of the liquid fuel in the primary fuel tank 16 and the exit height of the trap. The higher density of the product-rich material allows the system to absorb changes in the height of liquid metal in the fuel tank, due to consumption or addition of fuel, by smaller changes in the level of the product-rich liquid in the reactor. These changes are limited, however, by the requirement that the injector 14 must be surrounded by liquid and the trap inlet 34 must be fully covered with product-rich liquid. Therefore, the system operates steadily without the use of valves or control devices, other than that for the oxidizer flow rate, over a relatively wide range of inlet conditions.

If the reactor is operated at the low temperature end of the immiscible liquid range, the relatively low solubility of the alkali metal ensures that only a small percentage of the fuel passes unreacted through the system. A further embodiment of the system to be discussed infra illustrates a method of returning the unreacted fuel leaving the trap to the fuel tank 16.

When the system is initially loaded, product sealing material must be added to cover the trap inlet 34. This initial blockage could be achieved by adding a sample of the reaction product material and melting it in place, e.g., adding lithium fluoride in the case of a lithium-fluorine, fuel-oxidizer, system. Once the sealing material is present, the fuel can be added to the system in molten form. A less preferred procedure would be to block the exhaust line 28 with a valve (not shown), start the reaction and then open exhaust line 28 when sufficient product-rich liquid has been formed to ensure that the inlet 34 of the trap is covered with product-rich liquid during operation.

For starting the system, provision must be made to initially heat the reactor in order to liquify the reactant materials. An electrical heater 30 is provided to perform this function. Electrical cartridge heaters of various designs as well as pyrotechnic devices provide other possible means of heating the unit. In certain applications it is also possible to just melt the fuel and through oxidizer injection sufficiently heat the system to allow melting of the product material at the bottom of the reactor. An initial flow of inert gas may be required at start-up to remove any unreacted fuel trapped in the injector 14 at shutdown or during filling. Once the injector 14 is clear of fuel and cooled by the inert gas flow, the actual oxidizing gas flow may be started through the injector.

Temperature levels in the reactor are controlled by the flow of oxidizer with oxidizer flow rates being increased for higher thermal loads. The upper temperature limit of the reactor is given by the upper limit of the immiscible liquid range. As noted before, it is preferable to operate the reactor near the low temperature limit of the immiscible liquid range so that only small quantities of unreacted fuel pass through the reactor.

The requirement that the product-rich liquid be maintained as a liquid could be satisfied by heating and insulating the lower part of the reactor as shown in FIG. 1. In this instance, the load heat exchanger 21 only contacts the zone adjacent to the alkali, metal-rich liquid. The exceptional heat transfer characteristics of the molten alkali metals should allow relatively compact heat exchanger design in these instances. If the requirement that the product-rich material remains a liquid in the trap and exhaust line is met, it is possible for the load heat exchanger 21 to extend over the trap area of the reactor.

In cases where the alkali metal is reacted with a halogenated gas or liquid, as opposed to a pure halogen, other minor product materials are also formed. For example, the system lithium-sulfur hexafluoride yields lithium sulfide as a product in addition to the main lithium fluoride product material. In this case, the lithium sulfide is sufficiently soluble in the fluoride in the immiscible liquid regime so that it can be removed as a component of the product liquid. In many other cases, minor product compounds are sufficiently soluble in the major halogen product so that they flow out of the reactor as a component of the product liquid.

Rather than allow the reaction products 31 and product-rich liquid to merely accumulate in storage tanks such as tanks 29, the storage tank 29 may be heated by an electrical coil 35. The immiscibility of the reaction products 31 in the product-rich liquid will cause them to settle to the bottom of tank 29, while the metal fuel 15 will rise to the top. The fuel can be pumped from tanks 29 by pump 35 back to the fuel tank 16 via transfer line 37. Such an arrangement prolongs the usefulness of storage tank 29 by continuously transfering unreacted fuel back to tank 16.

Proper fuel levels are maintained in the primary fuel storage tank 16 by transfering fuel from the storage tank 29 and other fuel storage tanks (not shown) as required. Both pump 36 and transfer line 37 are covered with electrically heated insulation in order to maintain the fuel in liquid state during transfer. Fuel transfer can be intermittent since varying liquid levels in the primary fuel tank 16 are accomodated by smaller variations of the product-rich liquid levels in the reactor, as discussed above.

The liquid transfer between tanks 29 and 16 need not always be accomplished by a pump. Maintaining a higher gas pressure at the exit of the trap 32, which communicates through the exhaust line 28 with the top of the liquid fuel in tank 29, than is present above the liquid in the primary fuel tank 16 would also provide fuel transfer. This difference in gas pressure would be accomodated by the reactor by relatively minor changes in the level of the product-rich liquid. Other methods of transfer such as capillary action or wicks could also be employed.

The inlet of the fuel transfer system 38 must be located to provide maximum removal of the fuel as the product accumulates in the storage tank 29. Furthermore, proper ullage must be provided in the storage tank 29 to accomodate the fuel and product volume requirements unless alternate storage tanks are employed.

It is a characteristic of the reaction products of the alkali metals and halogen or halogenated gases and liquids that the solubility for the alkali metal in the solid state is even smaller than that of the product-rich liquid throughout the immiscible liquid range. Therefore, as the product-rich liquid cools in the storage tank 29 the products 31 solidify. The greatest portion of the unreacted fuel can be returned to the fuel inventory in tank 16. The solidified product 31 then accumulates at the bottom of the tank 29. This characteristic helps to provide good fuel utilization for the reactor system.

Not withstanding the fact that the unreacted fuel in the product-rich liquid can be recovered for the configuration shown it is still desirable that the product-right liquid contain as low a percentage of unreacted fuel as possible. The heating of the unreacted fuel from temperature levels near the melting temperature of the fuel at the fuel inlet line 20 to the much higher temperature levels near the melting temperature of the product-rich liquid at the exhaust line 28 represents a thermal burden to the reactor. While this energy can be utilized, up to a point, to reduce the electrical heating requirements or provide energy for an auxiliary heat exchanger in the storage tank 29, an excessive energy carry through in this fashion would be wasted. Therefore, it is preferable that the product-rich liquid leave the reactor at temperature levels near the lower end of the immiscible liquid range where the solubility of the fuel in the product-rich liquid is the least.

Figure 2:
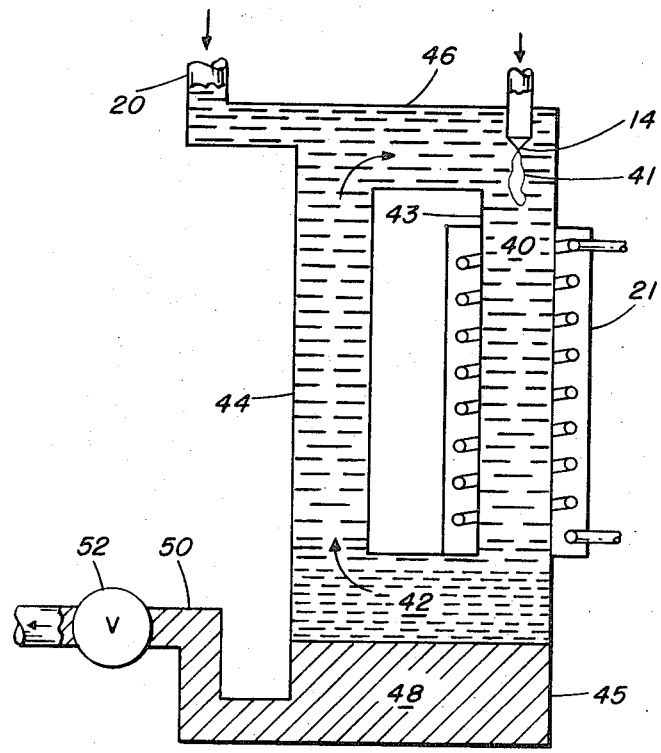
FIG. 2 is a diagram of an alternative embodiment of the present invention eliminating the need for a separate pump and transfer line.

FIG. 2 illustrates another embodiment of the reactor system which also utilizes the immiscible liquid properties of the reactants to achieve separation of the reaction products. The same numerals as used in FIG. 1 are employed in FIG. 2. to indicate like structure. In this embodiment the momentum of the oxidizer jet 41 from nozzle 14 is used to set up a circulation pattern down through the heat exchanger leg 43 of the reactor vessel and back through the return leg 44. The alkali metal fuel enters the reaction zone 40 at a temperature near the melting point of the reaction products. The liquid immediately downstream of the reaction zone would be at higher temperature. The oxidizer-fuel mixing ratio would be limited to prevent the products from exceeding the boiling temperature.

After the reaction is completed the product-rich liquid enters the heat exchanger leg 43 and cools at constant composition. As the temperature of the product-rich liquid is reduced, the mixture enters the two liquid region 42 separating further into immiscible fuel-rich and product-rich liquids. The reaction products 48 settle out and the fuel-rich phase is recycled to the inlet leg 46 and the reaction zone. Make up fuel flows into the top of the reactor, while the reaction products flow out of the bottom of the reactor vessel through exhaust line 50. A valve 52 is employed to control flow in the exhaust line 50. Initially valve 52 is closed to allow build up of the reaction product in the bottom of the reactor vessel. The bottom leg 45 of the reactor, in effect, serves as a reaction product tank. The recirculating reactor configuration eliminates the need for a separate transfer line. For purposes of illustration, insulation and electrical heating elements as shown in FIG. 1 have been left out of FIG. 2.

Figure 3:
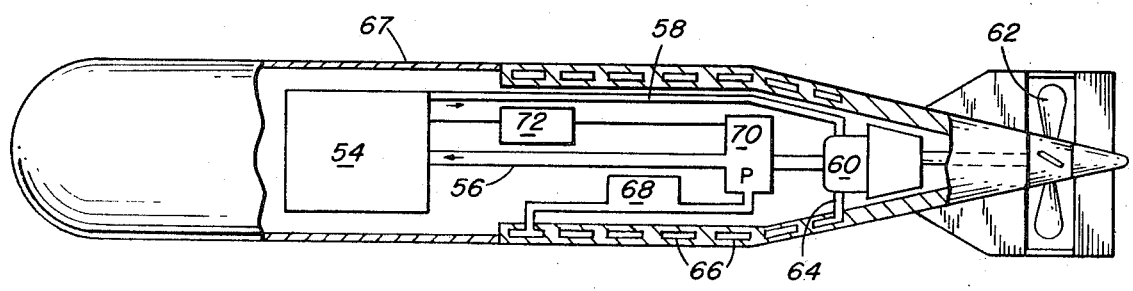
FIG. 3 is a diagram of the invention incorporated into a long range torpedo.

FIG. 3, illustrates an application of the invention. In this embodiment the reactor system of the present invention indicated by numeral 54 is employed to drive a long range torpedo. The mass of such a system would remain constant and no products would be expelled overboard. In addition, no sea water is brought on board provided the condenser is in the vehicle hull. The vapor pressure of the oxidant is sufficiently high at the ambient temperature encountered so that no pumps are required for its injection.

In operation cool water enters the reactor 54 from inlet line 56 and travels through the reactor to outlet line 58 where it has become steam, superheated to approximately 400° F. The superheated steam is carried by line 58 to a turbine 60 which is used to drive a propeller 62. After flowing through the turbine 60, the steam enters outlet line 64 and condenser passages 66 in the vehicle hull 67. After cooling the water enters storage tank 68 and eventually will be pumped again into inlet line 56 by pump 70, also driven by the turbine. A suitable start up device 72 may be employed to open any necessary valves in reactor 54 and electrically start the pump 70 which subsequently will be run off the power of the turbine 60.

Obviously, many modifications and variations of the present invention are possible in light of the above teachings. It is therefore to be understood that, within the scope of the appended claims, the invention may be practiced otherwise than as specifically described.

What is claimed is:

1. A heat generating reactor system using an alkali metal fuel and an oxidizer from the group consisting of halogen or halogenated fluids, said fuel and oxidizer combining to produce a reaction product, said reactor system comprising:
   a reactor vessel;
   a fuel tank means connected to said reactor vessel for continually filling said vessel with fuel;
   an oxidizer tank connected to said reactor vessel;
   means for controlling the flow of oxidizer from said oxidizer tank to said reactor vessel; and
   means for removing the reaction product produced in said vessel during the reaction of the fuel and oxidizer.

2. The heat generating reactor system of claim 1 wherein the oxidizer flow controlling means comprises:

a flow line connected at one end to said oxidizer tank;
   an injector nozzle in the top of said reactor vessel, said nozzle being connected to the other end of said flow line; and
   valve means for regulating the pressure of said oxidizer in said flow line.

3. The heat generating reactor system of claim 1 further comprising means for separating any unreacted fuel from the reaction products and returning the unreacted fuel to said fuel tank.

4. The heat generating reactor system of claim 3 wherein the removing means comprises:
   a trap extending through the bottom of said reactor vessel; and
   a product storage tank connected to said trap.

5. The heat generating reactor system of claim 4 wherein the separating means comprises:
   means for heating said product storage tank;
   line means connected at one end to said product storage tank and at the other end to said fuel tank for removing the unreacted fuel as the unreacted fuel separates from the more dense reaction products; and
   a pump in said line means for pumping the unreacted fuel to said fuel tank.

6. The heat generating reactor system of claim 5 wherein the oxidizer flow controlling means comprises:

a flow line connected at one end to said oxidizer tank;
an injector nozzle in the top of said reactor vessel, said nozzle being connected to the other end of said flow line; and
valve means for regulating the pressure of said oxidizer in said flow line.

7. The heat generating reactor system of claim 3 wherein the removing means and separating means comprises:
a product tank directly connected to and forming the bottom of said reactor vessel;
a product removal line connected to the bottom of said product tank; and
a recirculation leg connected at one end to the top of said product tank and at the other end to the top of said reactor vessel.

8. The heat generating reactor system of claim 7 wherein the oxidizer flow controlling means comprises:

a flow line connected at one end to said oxidizer tank;
an injector nozzle in the top of said reactor vessel, said nozzle being connected to the other end of said flow line; and
valve means for regulating the pressure of said oxidizer in said flow line.

9. A heat-generating reactor system for use in a torpedo having a propellor, said system using an alkali metal fuel and an oxidizer from the group consisting of halogen or halogenated fluids, said fuel and oxidizer combining to produce a reaction product, said reactor system comprising:
a reactor vessel;
fuel tank means connected to said reactor vessel for continually filling said vessel with fuel;
an oxidizer tank connected to said reactor vessel;
means for controlling the flow of oxidizer from said oxidizer tank to said reactor vessel;
means for removing the reaction product produced in said vessel during the reaction of the fuel and oxidizer;
heat exchange means for removing the thermal energy from said reactor vessel generated by the reaction of said fuel and oxidizer;
turbine means connected to said heat exchange means for converting the thermal energy into mechanical energy for driving a propellor; and
condenser means adapted for mounting within the hull of a torpedo having an inlet connected to said turbine means and an outlet connected to said heat exchange means.

* * * * *